(12) United States Patent
O'Neil

(10) Patent No.: US 8,841,563 B2
(45) Date of Patent: Sep. 23, 2014

(54) SPLIT LINE AND LOW VOLTAGE WIRE CONDUIT AND TRANSFORMER BOX

(76) Inventor: Ryan O'Neil, Omaha, NE (US)

( * ) Notice: Subject to any disclaimer, the term of this patent is extended or adjusted under 35 U.S.C. 154(b) by 73 days.

(21) Appl. No.: 13/594,987

(22) Filed: Aug. 27, 2012

(65) Prior Publication Data

US 2013/0048366 A1 Feb. 28, 2013

Related U.S. Application Data

(60) Provisional application No. 61/527,662, filed on Aug. 26, 2011.

(51) Int. Cl.
  *H05K 9/00* (2006.01)
  *H02G 15/117* (2006.01)
  *H02G 3/04* (2006.01)
  *H02G 15/115* (2006.01)

(52) U.S. Cl.
  CPC ........... *H02G 15/117* (2013.01); *H02G 3/0481* (2013.01); *H02G 15/115* (2013.01)
  USPC ......... 174/549; 174/68.1; 174/70 C; 174/668; 439/508; 361/662

(58) Field of Classification Search
  USPC ...... 174/68.1, 549, 70 C, 650, 653, 668, 350, 174/53, 38; 138/118; 385/109, 100; 439/508; 361/662
  See application file for complete search history.

(56) References Cited

U.S. PATENT DOCUMENTS

| | | | | |
|---|---|---|---|---|
| 2,440,668 A | | 4/1948 | Tarbox | |
| 2,585,054 A | | 2/1952 | Stachura | |
| 2,867,001 A | * | 1/1959 | Lewis et al. | 264/167 |
| 3,035,242 A | * | 5/1962 | Sloop | 439/508 |
| 3,076,167 A | * | 1/1963 | Spencer et al. | 439/508 |
| 3,110,754 A | * | 11/1963 | Witort et al. | 174/70 R |
| 3,472,945 A | * | 10/1969 | Trachtenberg | 174/53 |
| 4,052,911 A | | 10/1977 | Feldstein | |
| 4,275,768 A | * | 6/1981 | Riggs et al. | 138/104 |
| 4,707,074 A | * | 11/1987 | Heywood | 385/113 |
| 5,489,126 A | * | 2/1996 | Gray, Jr. | 285/93 |
| 5,834,932 A | * | 11/1998 | May | 324/107 |
| 6,180,721 B1 | | 1/2001 | Rogestedt | |
| 6,266,233 B1 | * | 7/2001 | O'Regan | 361/659 |
| 7,611,339 B2 | | 11/2009 | Tetzlaff | |
| 2013/0037157 A1 | * | 2/2013 | Morrow et al. | 138/111 |

* cited by examiner

*Primary Examiner* — Dhirubhai R Patel
(74) *Attorney, Agent, or Firm* — Daniel Boudwin; Global Intellectual Property Agency LLC

(57) ABSTRACT

Disclosed is a split conduit for separating line and low voltage wiring, wherein two wire or cable types are supported and do not interfere with one another along the conduit length. The conduit includes a rounded outer wall forming an enclosed cross section, wherein a partition is provided within the interior of the conduit that runs along its length to create a first and second pathway. The outer surface of the conduit is discretely marked based on line or low voltage, allowing a user to distinguish what wire type is in each pathway and to locate the partition without inspecting the wires or looking into the interior of the conduit. The split conduit is adapted to be connected to a split meter socket box having a divider for separating connection types, wherein wires from corresponding conduit chambers can be oriented appropriately to establish electrical connectivity within the meter box.

6 Claims, 2 Drawing Sheets

SPLIT LINE AND LOW VOLTAGE WIRE CONDUIT AND TRANSFORMER BOX

CROSS REFERENCE TO RELATED APPLICATION

This application claims the benefit of U.S. Provisional Application No. 61/527,662 filed on Aug. 26, 2011, entitled "O'Neil Conduit." The above identified patent application is herein incorporated by reference in its entirety to provide continuity of disclosure.

BACKGROUND OF THE INVENTION

1. Field of the Invention

The present invention relates to electrical wiring and conduits therefore. More specifically, the present invention relates to a split conduit for low voltage and line voltage, wherein cross talk between wires is eliminated and organization of wires is achieved through the conduit.

Voltage requirements for residential lighting can be broken down into two categories: line voltage and low voltage. Line voltage is the electrical potential that is provided in most residential homes and the voltage utilized without an intermediary transformer on a light fixture. Line voltage is the voltage directly supplied by a power line, and for residences it is typically between 110 and 120 volts. Line voltage is commonly used household appliances, lamps and other fixtures within the home that do not require a higher or lower voltage input. Low voltage, by contrast, is line voltage converted to a lower voltage using a transformer. Certain light fixtures and other electronic equipment may require low voltage to operate property, and therefore require line voltage to be transformed and lowered. Low voltage fixtures utilize smaller bulbs or light sources that are not equipped to accept standard line voltage.

Separation of line and low voltage electrical wires is essential when connecting wires to a meter box and routing the outgoing wires to specific fixtures. Incorrectly labeled wires can lead to confusion, and improperly installed wires can lead to damaged products. Without proper separation of the line and low voltage, crosstalk between wires may occur, resulting in the loss of data transmitted through low voltage wiring. Currently, an individual installing conduit has to run two separate conduits to separate line and low voltage, which slows the installation process, increases material costs and increases labor during installation.

The present invention is provided as an improved means of routing line and low voltage wires into a split meter socket box, connecting the wires to appropriate connectors and then routing the line and low voltage wires through a common assembly that separates the two wire types therein. A conduit having an internal partition is disclosed for reducing individual conduits carrying different voltage wires. The exterior of the conduit is adequately marked to facilitate identification of the wires within each of the conduit pathways. The split meter socket box itself is further split into a low and line voltage side, accepting the split conduit on incoming and outgoing sides and preventing cross talk therebetween.

2. Description of the Prior Art

Devices have been disclosed in the prior art that relate to electrical wiring and conduit devices. These include devices that have been patented and published in patent application publications. These devices generally relate to cable constructions and means of separating cable and electrical types. The prior art fails to disclose a unitary conduit having a split pathway therein, along with a split meter box that separates line and low voltage electrical assemblies. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 2,440,668 to Tarbox discloses a cable construction adapted for sheathing welding cables that carry high currents and thus intense heat. The cable construction comprises a strip of insulation and a plurality of electrical conducting units on each side thereof. The construction allows for adequate cooling, separation and support of the conductor strand formations. While disclosing a cable construction, the Tarbox device fails to disclose a split conduit for low and line voltage assemblies as described in the present invention, and further fails to disclose a split meter socket box for accepting line and low voltage wiring through an attached split conduit.

Further, U.S. Pat. No. 4,052,911 to Feldstein discloses a cable core conduit for a motion transmitting system having an outer casing, a centrally and longitudinally extending cavity therein, and a resilient metallic strength member separating the cavity into a first and second pathway. Each pathway is adapted to accept motion transmitting cable cores for slideable movement therein, while the plastic walls perform a bearing function against the cable core movement within each cavity. The cavities house cables for push-pull systems, wherein movement of cables is used as a control mechanism, and the cables are shrouded within the split cavity conduit. The Feldstein device is adapted to house and organize control cables that operate a mechanism receiving input from the internal cables. This type of conduit is not adapted to separate electrically conductive wires, while the present invention is desired to provide separated routing of high and low or low and line voltage electrical wires entering and exiting an electrical box.

Finally, U.S. Pat. No. 2,585,054 to Stachura discloses a flexible shield for electrical conductors, wherein a flexible sheath is provided having an openable and securable line of connection to form an enclosed conduit for one or a plurality of electrical wires. The conduit lies flat when not secured about its line of connection, while the interior formed by the secured sheath may further include interior walls or partitions for separation of conductors. The separable element along the line of connection is preferably a zip fastener that secures the outer walls of the sheath into a rounded form having an interior volume, and while the interior of the Stachura device may include interior partitions for separating different wire types. The structure of the Stachura device differs from that of the present invention, which provides a separated, formed conduit that is adapted for separating wires entering a split meter socket box.

The present invention provides a unique means of separating electrical lines of differing voltage through a common conduit. The conduit provides a split pathway for two different wire types using a unitary construction to eliminate cross talk and improve organization of wires entering and exiting a meter socket box from a pad transformer. It is submitted that the present invention substantially diverges in design elements from the prior art, and consequently it is clear that there is a need in the art for an improvement to existing electrical separating conduits and boxes. In this regard the instant invention substantially fulfills these needs.

SUMMARY OF THE INVENTION

In view of the foregoing disadvantages inherent in the known types of electrical conduits and split meter socket boxes now present in the prior art, the present invention provides a new conduit and meter socket box that can be utilized for providing convenience for the user when installing and separating line and low voltage wires.

It is therefore an object of the present invention to provide a new and improved electrical conduit device that has all of the advantages of the prior art and none of the disadvantages.

It is another object of the present invention to provide an electrical conduit device that provides a single conduit for routing two types of wiring, including high, low, line and fiber optic lines throughout a home.

Another object of the present invention is to provide an electrical conduit device to provide a ready means of identifying the type and pathway of a specific wire through the split conduit by way of markers along the exterior of the conduit.

Yet another object of the present invention is to provide an electrical conduit device that connects to a meter socket box having a split construction, separating a high/low or line/low voltage set of wires that are not adapted to make contact or cross talk.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
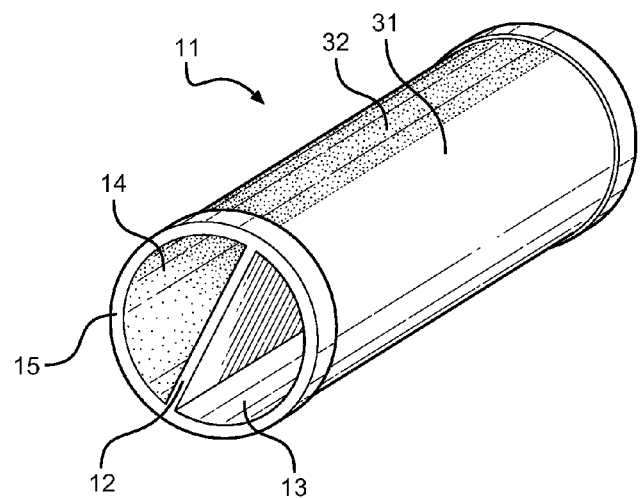
FIG. 1 shows a perspective view of a section of the disclosed split conduit.

Reference is made herein to the attached drawings. Like reference numerals are used throughout the drawings to depict like or similar elements of the electrical conduit device. For the purposes of presenting a brief and clear description of the present invention, the preferred embodiment will be discussed as used for separating line and low voltage wires in an electrical assembly and when routing such wires within a residence. The figures are intended for representative purposes only and should not be considered to be limiting in any respect.

Referring now to FIG. 1, there is shown a perspective view of the split conduit of the present invention. The conduit 11 comprises an elongated member having an enclosed cross section formed of circular or rounded sidewalls 15 to accept wires and cables therethrough. Within the interior of the cross section is a vertical partition 12 that divides the section into a first 13 and second 14 pathway through the conduit 11. The divided pathway provides clearance for wires or cables of differing type to be run in parallel to one another through a common conduit 11 without separating the two into separate runs. The partition 12 provides separating means between the pathways to prevent cross talk, shorts and to meet building codes required for wire separation of electrical assemblies.

Along the exterior of the conduit is the conduit outer surface, which is also separated into a first and second surface based on the location of the partition 12 and its contact with the conduit sidewalls 15. The first and second surface of the exterior surface correspond to the first 13 and second 14 interior conduit pathways, and are thus marked, painted or otherwise indicated 31, 32 using a visual marker or means of visual reference for being different from one another from an exterior perspective. These references may include different colors, textures, indicia, or any further means of signifying the different pathways therebelow the indicated surfaces. This allows an installer or inspection to visualize the routing of wires and their corresponding location within the conduit 11 without inspecting within the conduit or opening its cross section for direct viewing. This further allows an installer to easily monitor which orientation to install the conduit to an electrical box or from a transformer pad.

Figure 2:
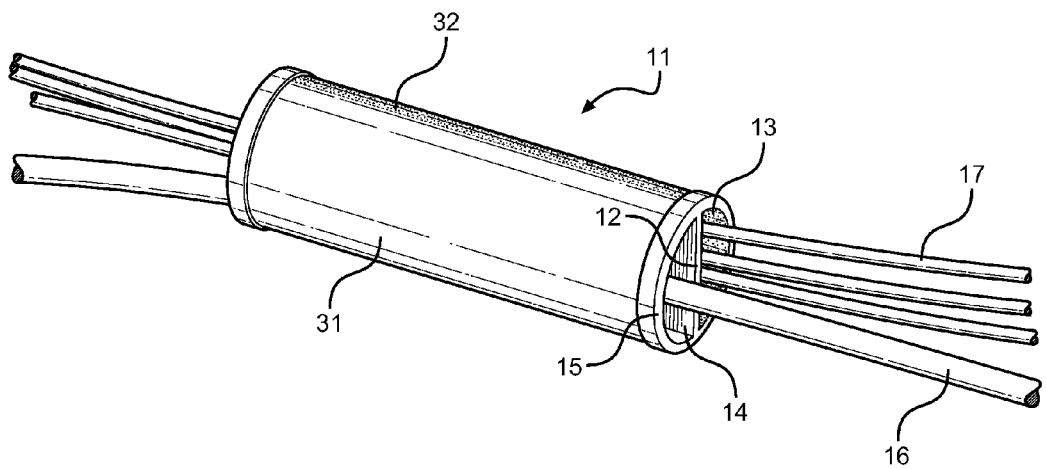
FIG. 2 shows another perspective view of the split conduit and the separation of differing wire types.

Referring now to FIG. 2, there is shown a second perspective view of the present invention in a working state, accepting a first 17 and second 16 set of wires therethrough. The conduit 11 provides a separated pathway 13, 14 for each set of wires to travel without contact with differing wire types, while the exterior of the conduit 11 provides clear indication of the partition 12 location and the location of the two separated pathways. It is desired to provide a split conduit device that is formed of a unitary construction, formed of an elongated section having an interior partition that is not assembled from a plurality of smaller components, but is of unitary construction. However, it is recognized that departures from this desired fabrication method may also be designed, falling within the scope of the present disclose and providing a conduit with a stable pathway separation. The exterior of the conduit provides a first marking 31 and a second marking 32 to indicate the bifurcated conduit and the location of each interior pathway through the conduit after installation and in facilitation of a user installing wiring using the disclosed conduit.

Figure 3:
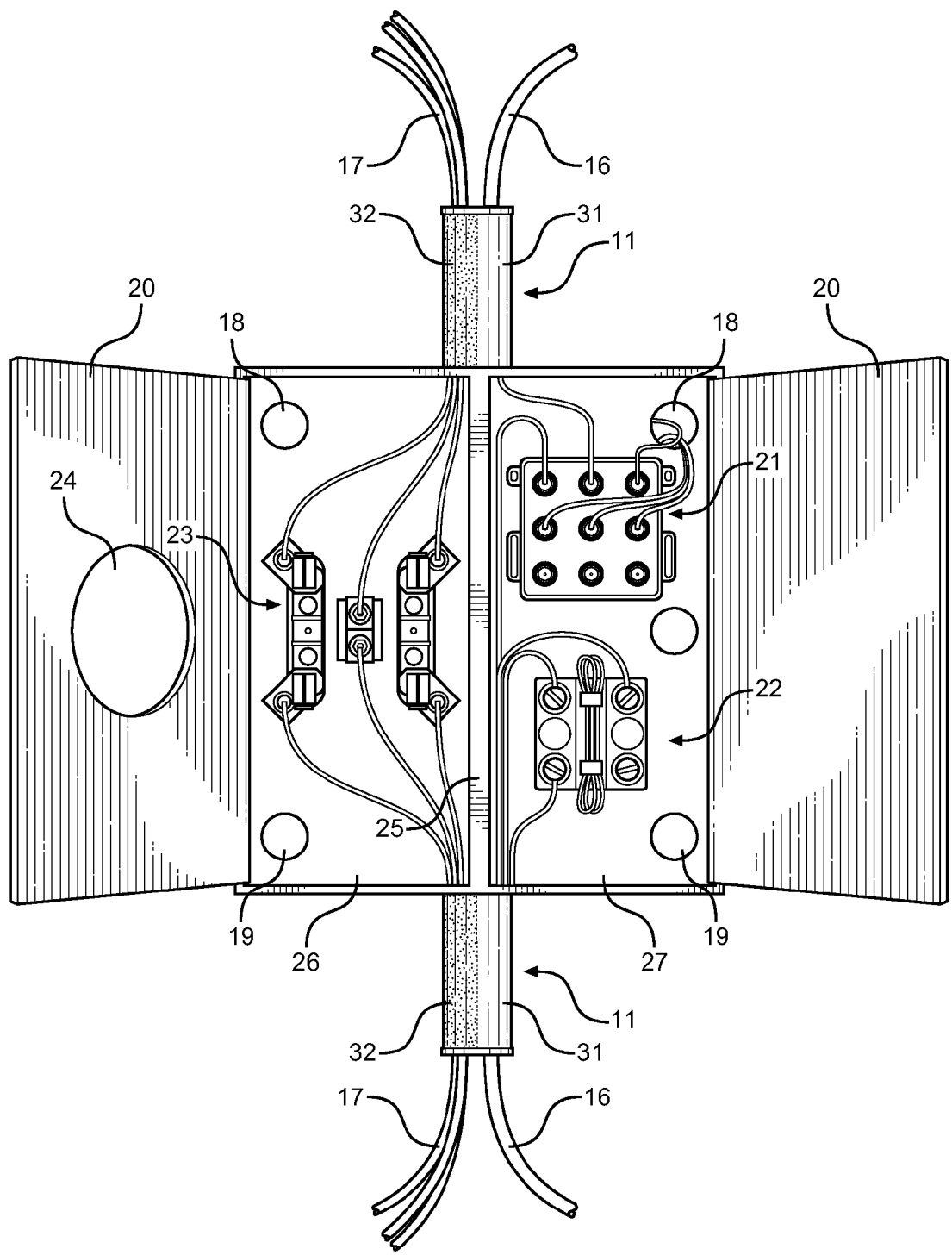
FIG. 3 shows a frontal view of the split conduit connecting to a split meter socket box, wherein line and low voltage lines are separated from one another by the conduit and the structure of the box.

Referring now to FIG. 3, there is shown a view of the split conduit of the present invention in an installed state, routing low 17 and line 16 voltage wires into a split meter socket box that includes housing having a line voltage portion 26 and a low voltage portion 27 separated by an upstanding divider wall 25. The divider wall 25 prevents wires from crossing between the separated portions of the box during and after assembly. The conduit 11 routes line voltage wires 17 through the line voltage side 31 of the conduit and into the line voltage portion 26 of the box via an upper or lower aperture that is aligned with the divider wall such that the partition within the split conduit aligns with the divider wall and provides a continuous barrier between incoming low and line voltage wires that are routed to respective sides of the meter socket box. The line voltage wires 17 are connected to a meter sock assembly 23 for connecting an electrical meter in line, after which the line voltage wires 17 are routed through an aperture at the base of the box that is aligned with the divider wall in the same fashion as the upper aperture. Similarly in the low voltage partition 27, low voltage wires 16 are routed through upper entrance aperture for connection to a coaxial splitter 21 and demarcation point 22 for a phone connection. The line voltage is then routed through the lower egress aperture and into the low voltage side 32 of connected conduit 11 at the base of the box. The line voltage wiring is utilized for common household connections and fixtures, while the low voltage wiring is utilized for coaxial cable connectors, phone, fiber optics and routing for specific light fixtures requiring lower than line voltage signals to operate. The rear surface of the housing is adapted to connect to a vertical wall or surface, while a plurality of apertures provide access to the structure for fasteners and for routing wire therethrough as required.

The disclosed meter socket box advances the field in the art of electrical installations in the ability to efficiently and effectively split low and line voltage wiring connections using a single conduit and single meter box assembly. The box comprises an enclosure having two partitions 26, 27 separated by a divider wall 25 and enclosed by sidewalls and hingeable and securable doors 20. For installation of a meter socket, an aperture 24 is provided in the line voltage side door for placement of an electrical meter therethrough and in connection to the meter socket assembly 23. It is submitted that the combination of a split conduit 11 and split meter socket box provides an efficient means of installing and inspecting separated wire types without requiring separate conduits and two distinct box structures.

Installing electrical wiring and connections can be a time consuming, costly, and labor intensive task. Without proper separation of the line voltage from high or low voltage wiring, crosstalk of wires may occur, resulting in data transfer loss and reduced signal through the low voltage wiring. Generally, an individual installing conduit has to run two separate conduits to separate line and low voltage, which results in a slower installation process, more materials used, and increased labor. The present invention is an insulating split conduit having an internal partition for installing line and low voltage wiring through a common electrical conduit. The divided tube and further the divided meter socket box provides space and separation of the line and low voltage wiring, which in turn saves time, labor, and materials during typical conduit installation. The box and conduit further eliminate electromagnetic field interference created by otherwise unseparated line or low voltage wiring, and thus reduces signal reduction and separates these wires as required by electrical codes in residential and commercial buildings. Electricians, homeowners, maintenance technicians installing and inspection electrical assemblies will find the split conduit and meter box beneficial, whereby the wires are separated and discretely indicated from the exterior of the box and the conduit.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A split meter socket box, comprising:
a housing having an interior volume, an upper conduit, a lower conduit, and a line voltage securable door and a low voltage securable door enclosing said interior volume; said interior volume divided into a line voltage portion and a low voltage portion by a vertical divider wall; said conduits having an enclosed cross section having rounded sidewalls; a partition dividing said cross sections into first and second pathways and extending along said conduits entire length; said first and second pathway adapted to accept and shield different wire and cable types without contact therebetween or cross talk; said conduits having an exterior surface divided into a first and second surface by said partition connection to said sidewalls; said first and second exterior surface having differing means of visual reference thereon for indication of each pathway a location from an exterior perspective, said upper and lower conduit partition aligned with said divider wall and providing access to both of said portions therethrough; said line voltage securable door covering said line voltage portion, said low voltage securable door covering said low voltage portion; an electricity meter aperture through at least one access panel for connection to a meter socket box wherein said meter socket box being installed in said line voltage portion provides an efficient means of installing and inspecting separated wire types via said aperture of the meter without requiring separate conduits and separate box structures.

2. The device of claim 1, wherein said divider wall and said portions are adapted to separate wire voltage types within said interior volume.

3. The device of claim 1, wherein said housing further comprises a rear wall for attachment to a structure, along with at least one aperture through said rear wall as an entrance to said structure.

4. The device of claim 1, wherein said conduits and said partitions are formed of a unitary construction.

5. The device of claim 1, wherein said means of visual reference further comprises a first and second surface color.

6. The device of claim 1, wherein said means of visual reference further comprises a first and second surface texture.

* * * * *